COMMERCIAL LEAD OXIDE (INVENTIVE PROCESS)

TETRABASIC LEAD SULFATE

United States Patent Office 3,788,898
Patented Jan. 29, 1974

3,788,898
FABRICATION OF NEGATIVE ELECTRODES IN LEAD-ACID BATTERIES
Charles Frederick Yarnell, Somerville, N.J., assignor to Bell Telephone Laboratories, Incorporated, Murray Hill, N.J.
Continuation of application Ser. No. 96,520, Dec. 9, 1970, which is a continuation-in-part of application Ser. No. 34,705, May 5, 1970, both now abandoned. This application June 7, 1972, Ser. No. 260,505
Int. Cl. H01m 39/00
U.S. Cl. 136—27
6 Claims

ABSTRACT OF THE DISCLOSURE

A method is described for producing the negative (Pb) electrode of a lead-acid battery. These negative electrodes are prepared by electrolytic reduction of tetrabasic lead sulfate ($4PbO \cdot PbSO_4$) to which a small amount of expander has been added. There are several advantages to using tetrabasic lead sulfate as the paste material for negative electrodes. For example, it can be synthesized in large batch quantities outside the battery grid where reaction conditions can be precisely controlled. It can be characterized and specified as a unique chemical compound. It can be stored for long periods without deterioration. Acid need not be added in making the paste material from the tetrabasic lead sulfate. The pasted negative plates are cured by simple air drying with little control of temperature or humidity to produce plates without cracks.

CROSS REFERENCE TO RELATED APPLICATION

This application is a continuation of a copending application, Ser. No. 96,520, filed Dec. 9, 1970( which was a continuation-in-part of an application, Ser. No. 34,705, filed May 5, 1970, both now abandoned.

Background of the invention

BACKGROUND OF THE INVENTION

(1) Field of the invention

The invention relates to lead-acid secondary batteries and to methods of their manufacture.

(2) Description of the prior art

The lead-acid secondary battery is used extensively as a source of power for starting automobile and other engines, as a constant voltage source and as a source of power for emergency use. For many of these uses this battery has proved quite satisfactory. It is relatively cheap, durable and responds to a variety of power demands. Its lifetime is usually limited to a few years but for many applications this is satisfactory.

One use of lead-acid batteries which is becoming increasingly important is as a standby source for emergency power use. In this application large power capacities are required but demand for this power is usually relatively infrequent. In order to obtain large power capacities from batteries, a relatively large initial investment is required.

With the recent development of long-life positive electrodes for lead-acid batteries, the role of the negative electrode in the performance of these batteries becomes more important. In the prior art, negative electrodes were normally made by filling a lead grid with a paste consisting essentially of finely divided lead, lead oxide, sulfuric acid and water. In drying the pasted grids, conditions such as humidity, temperature, etc., had to be precisely controlled to minimize cracking of the dried paste. Even under ideal conditions, cracking and shrinkage of the dried paste is a problem which tends to limit the size of the pellet which can be used in the grid structure. The electrodes were then electrolytically reduced to produce the negative spongy lead electrodes of the battery. It is also well known that the addition of small amounts of barium sulfate, organic material and carbon black improves the capacity of the negative electrode. These additives are known collectively as expanders.

The paste for the negative electrode was made by dry mixing the expander with lead and lead oxide powder and then adding aqueous sulfuric acid. The water and sulfuric acid reacted with the powder to form a complicated mixture of compounds involving lead, oxygen and the sulfate ion.

A lead grid was then pasted with this mixture and allowed to dry. A complex series of both liquid and solid-state chemical reactions take place as the paste is being mixed and continues even after the grids are pasted. The chemical species formed in the plate depend on the conditions of temperature, humidity, paste moisture content, drying atmosphere, etc. Examination of the dried paste by various means has shown that the plate contains varying proportions of Pb, PbO, $PbSO_4$, $PbO \cdot PbSO_4$, $3PbO \cdot PbSO_4 \cdot H_2O$, and $4PbO \cdot PbSO_4$.

Electrolytic reduction of the dry pasted negative electrode is carried out in dilute sulfuric acid and yields a sponge-like mass of lead crystals. This process is known as formation. Plates at various stages of formation have been microscopically examined and it has been postulated that the conversion to lead was by solution of lead sulfate and deposition of reduced lead.

There are several disadvantages to the prior art method of making negative electrodes. First and foremost is the fact that the paste material is not a unique chemical compound. Thus the paste material cannot be easily characterized by chemical or physical means and it is often difficult if not impossible to reproduce the same paste material from preparation to preparation. Further, these paste materials often do not prove satisfactory when applied to the battery grids. On drying they tend to crack and shrink away from the grid members. The work which lead to the instant invention was undertaken in an attempt to remedy or eliminate some of these deficiencies.

Also, a common method used in the formation of negative electrodes is not altogether satisfactory. This method is called tank formation and involves forming the electrode outside the battery case before assembly of the battery. Tank formation is often used in the fabrication of high quality batteries. In the tank formation of the negative electrode by conventional means blisters develop on the electrode surface. These lead blisters can flake off on handling which results in the loss of active material. Also, these lead blisters are a potential source of short-circuits in the battery.

SUMMARY OF THE INVENTION

The invention is a lead-acid battery in which the negative electrode is made according to a prescribed procedure using tetrabasic lead sulfate as a paste material. Small amounts of expanders may be added to the paste material in order to maintain a uniform porosity and prevent shrinkage of the spongy lead. At least 80 percent of the paste material (excluding water) should be tetrabasic lead sulfate.

There are several advantages to making the negative electrode according to the inventive process. The tetrabasic lead sulfate can be synthesized in large quantities outside the battery grid where reaction conditions can be precisely controlled. Tetrabasic lead sulfate is a pure compound which can be characterized and specified before the paste is made. The same compound can be used in both positive and negative electrodes. The properties of the negative electrode are not critically dependent on curing conditions. For example, pasted negative plates may be cured by simple air drying with little control of temperature or humidity to produce plates without cracks.

The formation of the negative electrode is carried out by conventional means in aqueous sulfuric acid. The specific gravity for the acid solution should be in the range from 1.001 to 1.150. The lower limit in acid concentration is determined by the electrical conductivity of the solution. Below specific gravity 1.001 the electrical conductivity of the solution is not sufficient to permit formation of the electrode in a reasonable time without using inconveniently high voltages. No particular advantages are found in the use of more concentrated acid solutions than specific gravity 1.150. A rather surprising finding was the fact that blistering on the surface of negative electrodes is reduced or eliminated when formation is carried out in more dilute acid solution. For this reason a preferred range of specific gravity is from 1.005 to 1.030. The lower limit of the preferred range is determined from considerations of electrical conductivity of the solution, as indicated above. Also, there is a further preference for the use of more dilute sulfuric acid. This preference arises from the fact that the formation time for the positive electrode is reduced as the acid solution becomes more dilute and becomes equal to the formation time for the negative electrode in the preferred range of specific gravity. This makes it possible to form already assembled battery cells in the battery casing. Properties of electrodes formed in such dilute acid have been under test for some time and appear comparable to properties of electrodes formed with more concentrated acid. However, sufficient testing has not been carried out to assure maximum life for more demanding use, such as for standby power sources. Thus where longest life is required and blistering can be tolerated or is not a problem as in jar formation, the preferred range of specific gravity is 1.030 to 1.070.

Figure 1A:
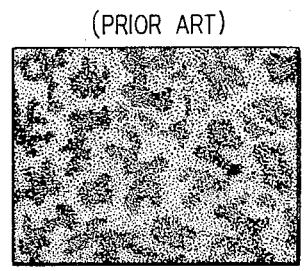
FIG. 1 is a plane view of two pellets from different negative electrodes just after formation in which one pellet (A) is made from commercial lead oxide in accordance with the prior art and the other pellet (B) from tetrabasic lead sulfate in accordance with the invention.

DETAILED DESCRIPTION (1) Synthesis of tetrabasic lead sulfate

As noted above, the invention involves the use of tetrabasic lead sulfate as a starting material in the fabrication of negative electrodes for lead-acid batteries. In this section, a preferred method for the preparation of tetrabasic lead sulfate is described in some detail.

(A) Tetrabasic lead sulfate is prepared by reacting lead oxide with sulfuric acid. It has been determined that a product more suitable for use in lead-acid batteries is obtained if at least 90 percent of the lead oxide is the orthorhombic modification. A significant increase in the other crystal modification, namely, tetragonal lead oxide, results either in a final product which is not pure tetrabasic lead sulfate or a product with less desirable crystal morphology.

Various impurities may have deleterious effects on the characteristics of lead-acid batteries. For this reason, the purity of the lead oxide and sulfuric acid used in the preparation of tetrabasic lead sulfate is of particular importance since such impurities are likely to contaminate the electrolyte or active part of the battery electrode. Thus, such impurities as silver, copper, aluminum, iron, zinc, manganese and others which have a deleterious effect on the electrochemical properties of electrolytic cells should not be present in quantities greater than 0.3 mole percent. For more demanding use and for particularly long life, it has been found that some advantages do accrue due to attention to purity. For example, while ordinary tap water certainly appears suitable in the synthesis of tetrabasic lead sulfate, there are advantages to the use of distilled or deionized water. One such advantage is reduction of the charging overvoltage. Overvoltage limits the capacity to which a battery can be charged with a given charging voltage. If a battery must be charged to a given capacity, more charging voltage and current are needed for batteries containing impurities which in turn limits the lifetime of the battery.

(B) Preparation of the tetrabasic lead sulfate is carried out in an aqueous suspension of lead oxide. Sufficient water is added to assure efficient mixing so that uniform reaction conditions are maintained throughout the process. The preferred composition is 4.5 gallons of distilled water for every ten pounds of lead oxide. One-tenth of this amount of distilled water would make efficient mixing difficult. Ten times this amount of water would make the reaction vessel overly large and not improve the mixing efficiency significantly.

In making this suspension, distilled water is preacidified to a pH between one and 3.5 before adding the orthorhombic lead oxide. In less acidic solutions than pH 3.5, orthorhombic lead oxide is converted to tetragonal lead oxide which leads, as stated above, to an undesirable product. The lower pH limit is set by the requirement that uniform reaction conditions be maintained and that the lead oxide is not exposed to excess sulfuric acid. For a pH less than one, a large fraction of the sulfuric acid needed for the synthesis must be added to the distilled water before the lead oxide is added. Thus, the lead oxide is exposed to excess sulfuric acid when it is added and before it can be uniformly disbursed in the aqueous suspension. The preferred pH is two.

(C) The reaction is carried out in a reaction vessel equipped both to heat and to mix the solution. The lead oxide suspension is maintained at a temperature between 80 and 100 degrees throughout the reaction. Below 80 degrees the reaction product has too small a particle size for suitable use in the fabrication of electrodes and is composed of a mixture of sulfate compounds. Above approximately 100° C. the mixture boils. The preferred temperature range is 80–85° C.

Efficient mixing is essential so as to maintain a uniform reaction mixture and to avoid exposing the lead oxide to excess sulfuric acid. The mixing should at least be fast enough to prevent the lead oxide from settling out of the suspension but not so fast as to fragment the crystals of tetrabasic lead sulfate formed in the suspension.

The rate of addition of sulfuric acid is again controlled by the requirement that the reaction mixture remain uniform and that the lead oxide not be exposed to excess sulfuric acid. Usually the total amount of sulfuric acid is added over a period of one hour. Significantly shorter times could be used only if elaborate means were employed to keep the reaction mixture uniform. An example is the use of a number of separate tubes to introduce the sulfuric acid in different parts of the reaction vessel. Using such means, times as short as ten minutes are possible without deterioration of the reaction product. Longer times are not detrimental to the reaction process but usually are wasteful of time.

A total of 0.2 mole of sulfuric acid should be added for every mole of lead oxide used. This requirement is derived from the stoichiometry of the reaction $5PbO + H_2SO_4 \rightarrow 4PbO \cdot PbSO_4 + H_2O$. Excess sulfuric acid beyond the stoichiometric amount is not required.

(2) Formation of the negative electrode

Before proceeding with the formation of the electrode, an expander material is added to the tetrabasic lead sulfate in order to retain greater capacity of the negative electrode over a longer period of time. It has been postulated that the effect of the expander is to maintain uniform porosity and prevent shrinkage of the spongy lead eventually formed in the negative electrode. Expander material is conveniently introduced in two ways, each of which yields essentially identical results. Expander can be added to the dry tetrabasic lead sulfate and the resulting mixture dry mixed or ball milled in order to obtain a uniform mixture. In the other method, the expander is added to an aqueous slurry of tetrabasic lead sulfate and mixing the slurry before separating the solid matter. This latter method is conveniently carried out directly after complete addition of the sulfuric acid and cooling of the lead oxide suspension. Normally, approximately two grams of expander are added for every 100 grams tetrabasic lead sulfate. The composition of expander may range from zero to 20 weight percent. Above 20 weight percent, the capacity per unit weight of lead is not further improved and the lead displaced by expander reduces capacity.

A typical procedure for making the negative electrode is as follows. The tetrabasic lead sulfate is made into a paste by mixing it with water. The paste can also be made directly from the aqueous suspension after completion of the reaction by removing sufficient water to make a paste. The proportion of water to tetrabasic lead sulfate is not critical except as to yield paste consistencies suitable for the pasting operation. Further, the amount of time from paste preparation to use is not critical. A grid structure, usually made from pure lead or a lead alloy such as lead-calcium or lead-antimony, is used to support the active part of the negative electrode. The paste is applied to the grid and allowed to dry. Air drying is preferred for convenience but use of vacuum conditions or temperatures above room temperature also yields satisfactory results. Excessively high temperatures which might decompose the tetrabasic lead sulfate and expander or melt the lead grid should be avoided.

The negative grids are then electrolytically reduced in aqueous sulfuric acid by passing a current through the electrode in a manner known to those knowledgeable in the art.

The specific gravity for the acid solution should be in the range from 1.001 to 1.150. The lower limit is determined by limited conductivity of the solution. However, in tank formation blistering is a problem both in negative electrodes made by the inventive process using tetrabasic lead sulfate, and in electrodes made by well-known processes. Use of the more dilute range of sulfuric acid has been found to reduce the extent of blistering on the electrode surface. Aqueous sulfuric acid with specific gravity less than 1.030 is preferred. At a specific gravity of 1.005 no blistering is observed. Further reduction in sulfuric acid concentration also yields blister-free electrodes, but reduced conductivity of the formation bath is sometimes inconvenient. For example, in mass production of lead-acid batteries, large numbers of electrodes are formed simultaneously. This is usually done by connecting the electrodes in series so as to insure that an equal amount of current passes through each electrode. Reduced conductivity increases the voltage drop across each electrode and limits the number of electrodes which can be simultaneously formed with a given supply voltage.

Despite the above problems with conductivity, it is possible to carry out the formation process starting with water alone. The reason for this is that sulfuric acid is produced in the formation process so that shortly after starting formation sufficient sulfuric acid is introduced into the water to overcome conductivity problems.

Properties of electrodes formed in such dilute acid have been under test for some time and appear compatible to properties of electrodes formed with more concentrated acid. However, tests have not yet been sufficient to assure maximum life for more demanding use as for standby power. At this time, therefore, where longest life is required and blistering can be tolerated or is not a problem as in jar formation, the preferred range of specific gravity is 1.030 to 1.070.

(3) The drawing

Figure 1B:
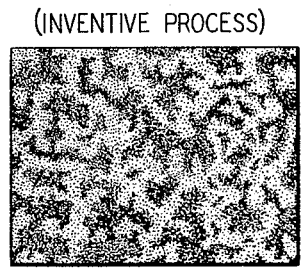

FIG. 1 shows portions of pellets from two negative electrodes just after formation. The surfaces of the pellets were prepared by first potting the pellets in epoxy and then polishing the surfaces. One pellet (A) was taken from a negative electrode made from lead oxide in accordance with the prior art. The other pellet (B) was made from tetrabasic lead sulfate in accordance with the inventive process. Both pellets show the spongy or porous lead which is the active material in the negative electrode. It should be noticed that in the pellet prepared in accordance with the inventive process the particle size of lead is more uniform than in the pellet prepared from lead oxide. Indeed, the latter pellet contains some rather large pieces of lead. It has been postulated that this variation in the particle size of the active lead can limit the capacity of the electrode.

Figure 2:
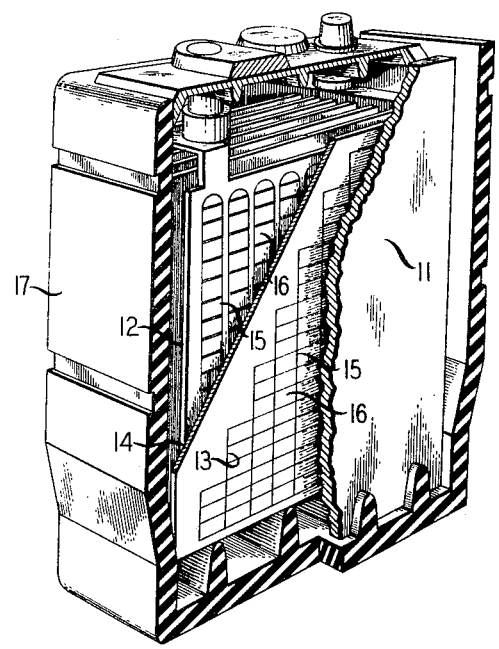
FIG. 2 is a perspective view partly in section showing a typical lead-acid battery containing a negative electrode prepared in accordance with the inventive process.

The device of FIG. 2 is in its fundamental design one cell of a characteristic rectangular battery 10 which is made up of two or more cells separated by a partition 11. Each cell is provided with vertical positive electrodes 12 and negative electrodes 13 insulated from one another by a separator. Both electrodes are commonly made up of grids the interstices of which are filled with pellets 16 of the active material. In the instance of the negative electrodes the pellets in the charged state are metallic lead, and for these purposes, these pellets are prepared in accordance with the inventive process. The pellets of the positive electrode are lead dioxide in the charged state. Commonly, grids used in structures of the type shown in the figure, while primarily lead, contain alloying elements such as antimony and/or calcium to improve strength. Spaces within the case 17 between separators 14 are filled with electrolyte which is generally aqueous sulfuric acid.

Figure 3:
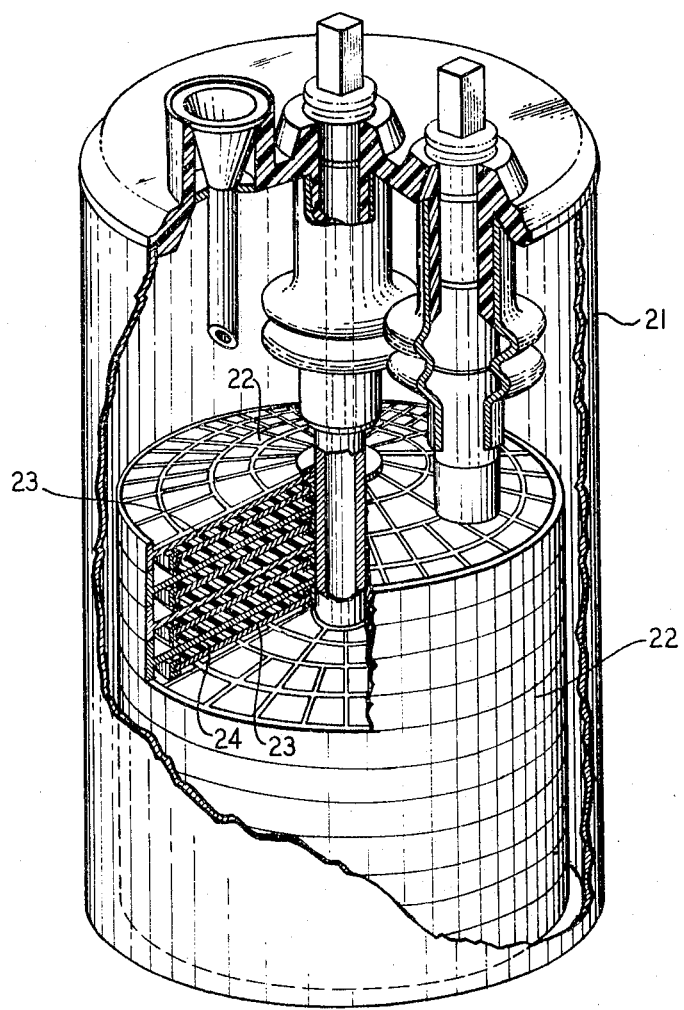
FIG. 3 is a perspective view partly in section of an alternative battery structure employing a negative electrode prepared in accordance with the inventive process.

The structure shown in FIG. 3 is a radically new design currently under consideration for long term standby use. Structurally, this apparatus 20 includes an outer container 21, horizontally disposed positive electrodes 22, and negative electrodes 23 which may be conical in shape. Electrical isolation of the positive and negative electrodes is accomplished by means of separators 24. While there are several distinguishing characteristics of engineering significance in structures of the type shown, it is significant from the standpoint of this description to note that negative electrodes 23 are again made of grids which contain active pellets. From the inventive standpoint, such pellets are prepared in accordance with the outlined procedure.

A description of this new type of lead-acid structure and certain of its operating characteristics may be found in U.S. Pat. 3,434,883.

What is claimed is:

1. Process for the fabrication of negative electrodes for lead-acid batteries, said negative electrode consisting of a grid, interstices of which are filled with a substance consisting essentially of lead, made by a series of steps including filling the interstices of a grid structure with a paste consisting essentially of water and tetrabasic lead sulfate and electrolytically reducing to yield lead, substantially all of the lead filling the said interstices being produced by the said electrolytic reduction of said tetrabasic lead sulfate, said tetrabasic lead sulfate having been prepared by:

(a) admixing lead oxide and an aqueous medium to produce an aqueous suspension, said lead oxide being at least 80 percent by weight of the orthorhombic modification, (b) reacting the lead oxide in the aqueous medium with sulfuric acid to form said tetrabasic lead sulfate, and (c) separating water from said tetrabasic lead sulfate.

2. Process of claim 1 in which the aqueous medium is preacidified to a pH range of from one to 3.5 before adding the lead oxide.

3. Process of claim 1 in which the paste contains an expander.

4. Process of claim 1 in which the electrolytic reduction is carried out in aqueous sulfuric acid with specific gravity between 1.001 and 1.150.

5. Process of claim 4 in which the specific gravity of the aqueous sulfuric acid is between 1.005 and 1.030.

6. Process of claim 4 in which the specific gravity of the aqueous sulfuric acid is between 1.030 and 1.070.

References Cited

UNITED STATES PATENTS

| | | | |
|---|---|---|---|
| 3,194,685 | 7/1965 | Malloy | 136—27 |
| 3,244,563 | 4/1966 | Coppersmith et al. | 136—27 |
| 3,173,810 | 3/1965 | Voss et al. | 136—27 |
| 2,422,437 | 6/1947 | Plews et al. | 136—27 |
| 2,658,097 | 11/1953 | Orsino | 136—27 |
| 3,084,207 | 4/1963 | Hughes et al. | 136—27 |
| 1,484,088 | 2/1924 | Schumacher | 423—559 |

ANTHONY SKAPARS, Primary Examiner